US009847692B2

United States Patent
Honda (10) Patent No.: US 9,847,692 B2
(45) Date of Patent: Dec. 19, 2017

(54) MOTOR (71) Applicant: ASMO CO., LTD., Shizuoka-ken (JP)

(72) Inventor: Tetsuya Honda, Kosai (JP)

(73) Assignee: ASMO CO., LTD., Shizuoka-ken (JP)

( * ) Notice: Subject to any disclaimer, the term of this patent is extended or adjusted under 35 U.S.C. 154(b) by 786 days.

(21) Appl. No.: 14/347,164

(22) PCT Filed: Sep. 24, 2012

(86) PCT No.: PCT/JP2012/074404
§ 371 (c)(1),
(2) Date: Mar. 25, 2014

(87) PCT Pub. No.: WO2013/047442
PCT Pub. Date: Apr. 4, 2013

(65) Prior Publication Data
US 2014/0232247 A1 Aug. 21, 2014

(30) Foreign Application Priority Data

Sep. 30, 2011 (JP) .................................. 2011-217245

(51) Int. Cl.
*H02K 7/116* (2006.01)
*H02K 7/00* (2006.01)
*H02K 7/118* (2006.01)

(52) U.S. Cl.
CPC ........... *H02K 7/003* (2013.01); *H02K 7/1166* (2013.01); *H02K 7/118* (2013.01)

(58) Field of Classification Search
CPC .... H02K 7/1166; H02K 7/1163; H02K 7/116; H02K 7/003; F16D 3/76
(Continued)

(56) References Cited

U.S. PATENT DOCUMENTS 6,575,277 B1 * 6/2003 Torii ..................... E05F 11/505
192/12 B
2002/0011390 A1 * 1/2002 Yamamoto .............. F16D 15/00
192/38
(Continued)

FOREIGN PATENT DOCUMENTS

CN 1460159 A 12/2003
CN 201699521 U 1/2011
(Continued)

OTHER PUBLICATIONS

Chinese Office Action of CN 201280046209.0 dated Nov. 30, 2015 with its English Translation.

*Primary Examiner* — Quyen Leung
*Assistant Examiner* — Robert E Mates
(74) *Attorney, Agent, or Firm* — Christensen, Fonder, Dardi & Herbert PLLC (57) ABSTRACT

A coupling portion is provided on either a rotary shaft or a worm shaft in an integrally rotational manner, said coupling portion for connecting the rotary shaft to the worm shaft and having a coupling hole therein. The coupling projection provided on the other of the rotary shaft and the worm shaft is inserted in the coupling hole. A circumferential clearance and a radial clearance are formed between the inner surface of the coupling hole and the coupling projection. Circumferential buffer portions are interposed in the circumferential clearance, and radial buffer portions are interposed in the radial clearance. The inner surface of the coupling hole and the coupling projection are arranged such that the circumferential buffer portions are compressed to deform in the circumferential direction whereby to allow the buffer portions to be brought into contact with each other when the rotary shaft is rotating.

9 Claims, 3 Drawing Sheets (58) Field of Classification Search
USPC ....... 310/99, 83, 75 D, 75 R; 464/89, 90, 91
See application file for complete search history.

(56) References Cited

U.S. PATENT DOCUMENTS

| | | | |
|---|---|---|---|
| 2002/0047347 A1* | 4/2002 | Torii | H02K 7/1166 310/68 B |
| 2002/0158527 A1 | 10/2002 | Kawakami et al. | |
| 2004/0108177 A1 | 6/2004 | Eberle et al. | |
| 2004/0164629 A1 | 8/2004 | Kawakami et al. | |
| 2007/0188032 A1* | 8/2007 | Toyoda | H02K 7/1166 310/75 R |
| 2008/0245636 A1* | 10/2008 | Gotou | H02K 7/108 192/48.3 |
| 2009/0001829 A1 | 1/2009 | Uchimura et al. | |
| 2009/0091203 A1* | 4/2009 | Petereit | F16C 17/02 310/90 |
| 2009/0212646 A1* | 8/2009 | Abe | G11B 19/2027 310/51 |
| 2010/0164333 A1* | 7/2010 | Uchimura | H02K 11/215 310/68 B |

FOREIGN PATENT DOCUMENTS

| | | |
|---|---|---|
| JP | 2003-235205 A | 8/2003 |
| JP | 2007-267595 A | 10/2007 |
| JP | 2009-011077 A | 1/2009 |
| JP | 2009-065789 A | 3/2009 |
| JP | 2009-273331 A | 11/2009 |
| JP | 2010-154736 A | 7/2010 |

\* cited by examiner

MOTOR

RELATED APPLICATIONS

The present is a National Phase entry of PCT Application No. PCT/JP2012/074404, filed Sep. 24, 2012, which claims priority from Japanese Patent Application No. 2011-217245, filed Sep. 30, 2011, the disclosures of which are hereby incorporated by reference herein in their entirety.

FIELD OF THE INVENTION

The present disclosure relates to a motor having a speed reduction mechanism that includes a worm shaft and a worm wheel.

BACKGROUND OF THE INVENTION

Conventionally, this type of motor includes a worm shaft, which is coaxially coupled to a rotary shaft, or a drive shaft, of a motor body to rotate integrally with the drive shaft. For example, a motor disclosed in Japanese Laid-Open Patent Publication No. 2009-11077 includes a rotary shaft and a worm shaft, which are made of metal. The worm shaft includes a coupling portion formed at an axial end. A coupling hole is formed in the coupling portion. A coupling projection at a distal end of the rotary shaft is inserted into the coupling hole, so that the rotary shaft and the worm shaft are directly coupled to each other.

In the above described motor, for example, when the rotary shaft and the speed reduction mechanism are driven to rotate in the forward direction, the load from the output portion may stop, or locks, the rotation. At this time, the teeth of the worm shaft, or the worm portion, may bind with the teeth of the worm wheel. If the rotary shaft and the speed reduction mechanism begin rotating in the reverse direction from this state, torque for undoing the bound state is required in addition to the torque for rotating the worm shaft.

To solve this problem, clearances may be provided between the inner surface of the coupling hole of the worm shaft and the coupling projection of the rotary shaft both in the circumferential direction and in the radial direction. In a case in which such clearances are provided, when the rotary shaft starts rotating in the reverse direction from the bound state, that is, when the worm shaft starts rotating in the reverse direction, the rotary shaft is rotated freely for a certain period of time. In this period, the rotary shaft gains an inertial force, or a rotational momentum. After rotating freely due to the clearances, the rotary shaft violently strikes the inner surface of the worm shaft coupling hole with the inertial force. This releases the bound teeth of the worm shaft and the worm wheel from each other in a favorable manner.

SUMMARY OF THE INVENTION

Problems that the Invention is to Solve

In the above described motor, the clearances in the circumferential direction and the radial direction are formed between the inner surface of the worm shaft coupling hole and the rotary shaft coupling projection. Therefore, when the above described motor is operating, for example, the worm shaft may move uncontrollably in the circumferential direction and the radial direction due to, for example, imperfect alignment. Uncontrollable movements of the worm shaft may cause the inner surface of the coupling hole to strike the coupling projection, resulting in noises.

Accordingly, it is an objective of the present disclosure to provide a motor that suppresses the generation of noises caused by uncontrollable movements of a worm shaft.

Means for Solving the Problems

In accordance with one aspect of the present disclosure, a motor is provided that includes a motor body having a rotary shaft, a speed reduction mechanism, which includes a worm shaft and a worm wheel meshed with the worm shaft, and a coupling portion, which has a coupling hole and couples the rotary shaft and the worm shaft with each other so that the rotary shaft the worm shaft are integrally rotational. The coupling portion is provided to be rotational integrally with one of the rotary shaft and the worm shaft. A coupling projection is provided on the other one of the rotary shaft and the worm shaft. The coupling projection is inserted in the coupling hole. A circumferential clearance, which is a clearance in a circumferential direction, and a radial clearance, which is a clearance in a radial direction, are formed between an inner surface of the coupling hole and the coupling projection. A circumferential buffer portion is located in the circumferential clearance. A radial buffer portion is located in the radial clearance. The inner surface of the coupling hole and the coupling projection are configured to be contactable with each other in the circumferential direction while compressing and deforming the circumferential buffer portion in the circumferential direction when the motor body is driven to rotate the rotary shaft.

According to this configuration, the circumferential buffer portion and the radial buffer portion are provided in the circumferential clearance and the radial clearance between the inner surface of the coupling hole and the coupling projection, respectively. This reduces uncontrollable movements of the worm shaft when rotating. As a result, the generation of noise caused by the coupling hole inner surface striking the coupling projection is suppressed. Further, when the rotary shaft is driven to rotate in the reverse direction, that is, when the rotary shaft starts rotating in the reverse direction with the worm shaft bound with the worm wheel, the rotary shaft rotates while compressing and deforming the circumferential buffer portion between the coupling hole inner surface and the coupling projection. During this time, the rotary shaft gains inertial force, or the momentum of rotation. Thereafter, with the circumferential buffer portion compressed, the coupling hole inner surface and the coupling projection contact each other in the circumferential direction while receiving the inertial force of the rotary shaft. This releases the worm shaft and the worm wheel, which have been bound to each other, from each other. According to this configuration, as described above, the circumferential buffer portion and the radial buffer portion suppress uncontrollable movements of the worm shaft, while ensuring the inertial force of the rotary shaft using the clearance between the coupling projection and the inner surface of the coupling hole.

According one form of the disclosure, the rotary shaft and the worm shaft are made of metal, and the coupling portion is a plastic member formed separately from the rotary shaft and the worm shaft.

According to this configuration, the inner surface of the coupling hole, into which the coupling projection of the worm shaft or the rotary shaft is inserted, is also made of plastic. Thus, when the motor body rotates the rotary shaft, noise caused by the coupling hole inner surface striking the coupling projection in the circumferential direction is suppressed. This further suppresses the generation of noise.

According one form of the disclosure, the circumferential buffer portion and the radial buffer portion are provided in the coupling portion.

According to this configuration, the circumferential buffer portion and the radial buffer portion are formed in the coupling member, which is a plastic member separate from the rotary shaft and the worm shaft. The circumferential buffer portion and the radial buffer portion can therefore be formed.

According one form of the disclosure, the circumferential buffer portion and the radial buffer portion are made of rubber.

According to this configuration, since the circumferential buffer portion and the radial buffer portion are made of rubber, uncontrollable movements of the worm shaft are suppressed in a favorable manner.

According one form of the disclosure, an axial buffer portion is located between the coupling projection and a bottom surface of the coupling hole in the axial direction.

According to this configuration, due to the characteristics of the worm shaft and the worm wheel of the speed reduction mechanism, reversal of rotation of the worm shaft generates a load in the axial direction. The load may cause the coupling projection to strike the bottom surface of the coupling hole in the axial direction or may cause the worm shaft to strike the rotary shaft in the axial direction. However, such possible striking is suppressed by the axial buffer portion. As a result, the generation of noise caused by such striking is suppressed.

According one form of the disclosure, the rotary shaft and the worm shaft are made of metal. The coupling portion is a plastic member formed separately from the rotary shaft and the worm shaft, and the axial buffer portion is provided in the coupling portion.

According to this configuration, the axial buffer portion is formed in the coupling member, which is a plastic member separate from the rotary shaft and the worm shaft. The axial buffer portion can therefore be formed easily.

According one form of the disclosure, the axial buffer portion is made of rubber.

According to this configuration, since the axial buffer portion is made of rubber, the coupling projection is prevented from striking the bottom surface of the coupling hole in the axial direction, and the worm shaft is prevented from striking the rotary shaft in the axial direction in a favorable manner.

DETAILED DESCRIPTION OF THE PREFERRED EMBODIMENTS

Hereinafter, a preferred embodiment according to the present disclosure will be described.

Figure 1:
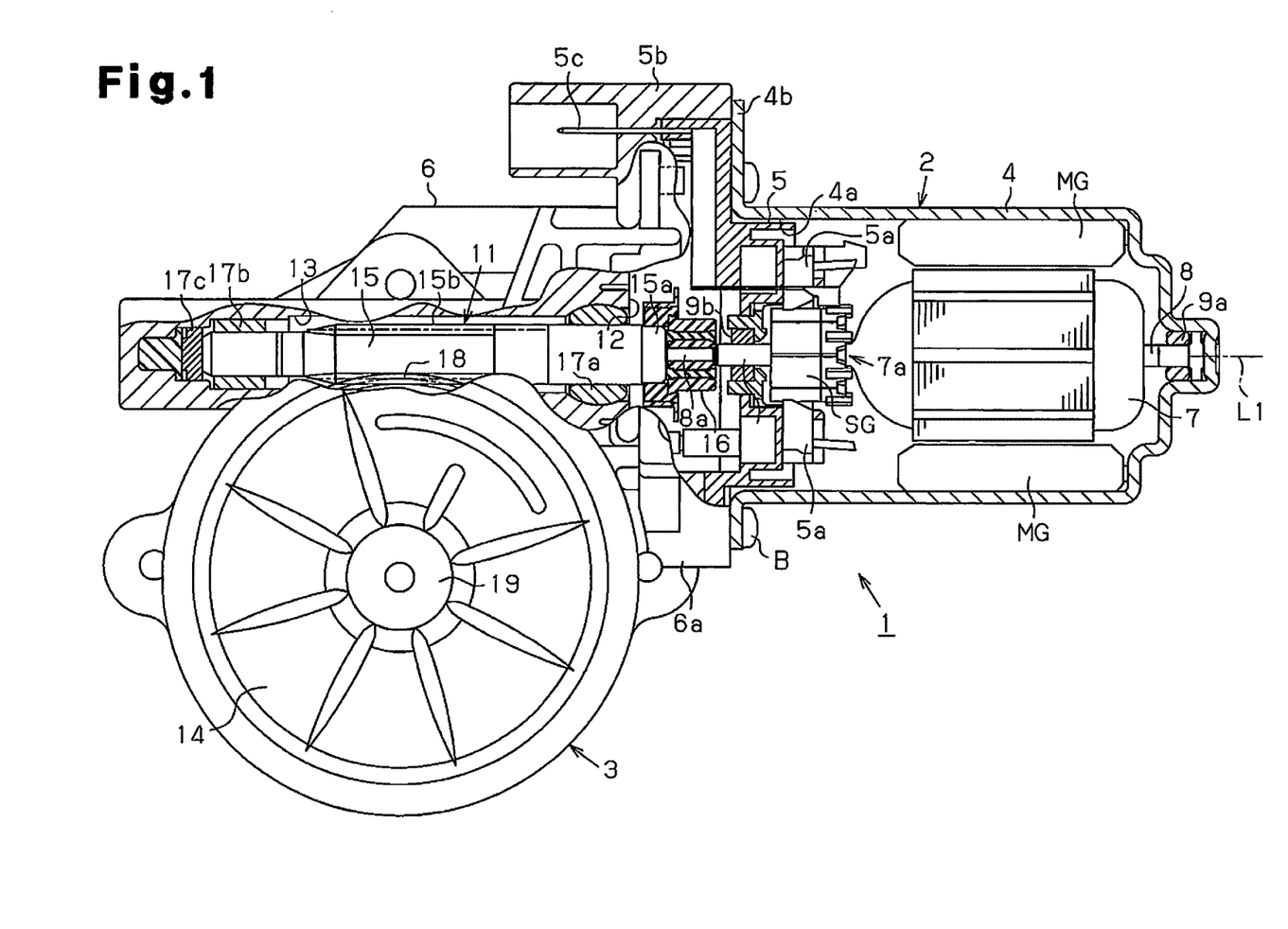
FIG. 1 is a cross-sectional view of a motor.

A motor 1 illustrated in FIG. 1 is used, for example, as a drive source of a wiper device (not shown) mounted on a vehicle. The motor 1 includes a motor body 2 and a speed reducing portion 3, which reduces the speed and increases the torque of the output rotation of the motor body 2 and transmits the rotation to the wiper device.

The motor body 2 also includes a yoke 4 as a yoke housing. The yoke 4 is made of conductive metal and shaped as a cylinder with a closed end. A flange 4b is formed at an opening 4a of the yoke 4. The speed reducing portion 3 has a housing 6. The flange 4b is coupled and fixed to a fixing portion 6a of the gear housing 6 with bolts B.

A brush holder 5, which is made of an insulating material such as plastic, is attached to the opening 4a of the yoke 4 to close the opening 4a. When the yoke 4 and the gear housing 6 are secured to each other with the bolts B, the brush holder 5 is tightly held by the flange 4b and the fixing portion 6a of the gear housing 6.

Magnets MG are fixed to the inner surface of the yoke 4 to face each other. An armature (rotor) 7 is rotationally accommodated inward of the magnets MG which face each other. A rotary shaft 8 is fixed to the armature 7. The proximal end of the rotary shaft 8 is rotationally supported by a bearing 9a provided on the inner bottom of the yoke 4. A bearing 9b is attached to a center position of the brush holder 5 to rotationally support the distal end of the rotary shaft 8, which protrudes into the gear housing 6.

The brush holder 5 holds a pair of feeder brushes 5a. The brushes 5a are configured to slide along segments SG of a commutator 7a of the armature 7 to feed currents to the segments SG. The brush holder 5 has a connector portion 5b, which is connectable with an external connector (not shown). Currents from the external connector are supplied to the brushes 5a via terminals 5c provided in the connector portion 5b.

The speed reducing portion 3 includes the gear housing 6 and a speed reduction mechanism 11 accommodated in the gear housing 6. A joint accommodating portion 12 is formed in the gear housing 6 at the fixing portion 6a, which is fixed to the yoke 4. The joint accommodating portion 12 has an opening that faces the yoke 4. The gear housing 6 has a worm shaft accommodating portion 13 and a worm wheel accommodating portion 14. The worm shaft accommodating portion 13 extends from the joint accommodating portion 12 along an axis L1 of the rotary shaft 8 and in a direction opposite from the yoke 4. The worm wheel accommodating portion 14 is located beside the worm shaft accommodating portion 13, or on the lower side as viewed in FIG. 1.

The rotary shaft 8 extends through the brush holder 5 and has a distal end 8a, which protrudes into the joint accommodating portion 12. The joint accommodating portion 12 accommodates a joint 16 in it. The joint 16 is a coupling portion that couples the distal end 8a of the rotary shaft 8 and a worm shaft 15 accommodated in the worm shaft accommodating portion 13 to each other.

The worm shaft 15 is arranged to be coaxial with the rotary shaft 8. The worm shaft 15 has a proximal end, which is located at the right end as viewed in FIG. 1 and is connected to the joint 16. At the proximal end, that is, in the vicinity of a coupling projection 15a, which will be discussed below, the worm shaft 15 is rotationally supported by a bearing 17a provided in the gear housing 6. The distal end of the worm shaft 15 is rotationally supported by a bearing 17b provided in the worm shaft accommodating portion 13. The worm shaft 15 has a screw-like worm portion 15b formed at center portion in the axial direction, or a section between the bearings 17a, 17b. The worm shaft accommodating portion 13 has a thrust receiving plate 17c at a closed end in the axial direction. The thrust receiving plate 17c receives thrust load of the worm shaft 15.

The internal space of the worm shaft accommodating portion 13 is connected to the internal space of the worm wheel accommodating portion 14. The worm wheel accommodating portion 14 rotationally accommodates a disk-like worm wheel 18 in it. The worm wheel 18 is meshed with the worm portion 15b. The axis of the worm wheel 18 extends perpendicular to the axis of the worm shaft 15, or in a direction perpendicular to the sheet of FIG. 1. The worm wheel 18 and the worm shaft 15 form the speed reduction mechanism 11. An output shaft 19 is provided at the radial center of the worm wheel 18 to be rotational integrally with the output shaft 19 so that the output shaft 19 extends along the axis of the worm wheel 18. The output shaft 19 has a distal end, which is coupled to the wiper device.

[Structure of Joint]

Hereinafter, the joint 16, which couples the rotary shaft 8 of the motor body 2 and the worm shaft 15 of the speed reducing portion 3 to each other, will be described with reference to FIGS. 2A and 2B. As shown in FIG. 2B, the joint 16 has a plastic portion 20, which is fixed to the distal end 8a of the rotary shaft 8 to rotate integrally with the rotary shaft 8, first rubber members 21, and second rubber members 22a, 22b. The first and second rubber members 21, 22a, 22b are integrally formed with the plastic portion 20 by two-color molding.

The plastic portion 20 has a substantially cylindrical fixing portion 23, which is fixed to the distal end 8a of the rotary shaft 8. The distal end 8a of the rotary shaft 8 has a flat shape with a pair of parallel surfaces. The distal end 8a is press-fitted in a press-fitting hole 24, which is formed to extend axially through a center portion of the fixing portion 23.

The fixing portion 23 has a pair of rubber accommodating holes 25 located about, or radially outside of, the press-fitting hole 24. The rubber accommodating holes 25 are arranged at a 180-degree interval in the circumferential direction. Each rubber accommodating hole 25 has one of the first rubber members 21. An end of each first rubber member 21 that is closer to the worm shaft 15 serves as a projection 21a, which protrudes in the axial direction from an end face 23a of the fixing portion 23 that is close to the worm shaft 15. The end face 23a is a bottom surface of coupling hole 28 in the axial direction. The first rubber members 21 are axial buffer portions, which absorb the load in the axial direction received by the worm shaft 15 toward the motor body 2. Each first rubber member 21 has at its ends in the axial direction a step portion 21b. The step portions 21b are engaged with the rubber accommodating hole 25 in the axial direction to prevent the first rubber member 21 from coming off in the axial direction.

A worm shaft coupling portion 26 is integrally formed in a part of the fixing portion 23 that is close to the worm shaft 15. The worm shaft coupling portion 26 has a cylindrical shape with a diameter larger than the fixing portion 23. That is, in the present embodiment, the plastic portion 20 as a small diameter portion and the worm shaft coupling portion 26 as a large diameter portion form a plastic single member extending along the axis L1. A flange portion 27 is formed at an axial end of the worm shaft coupling portion 26 that is close to the motor body 2.

Figure 2A:
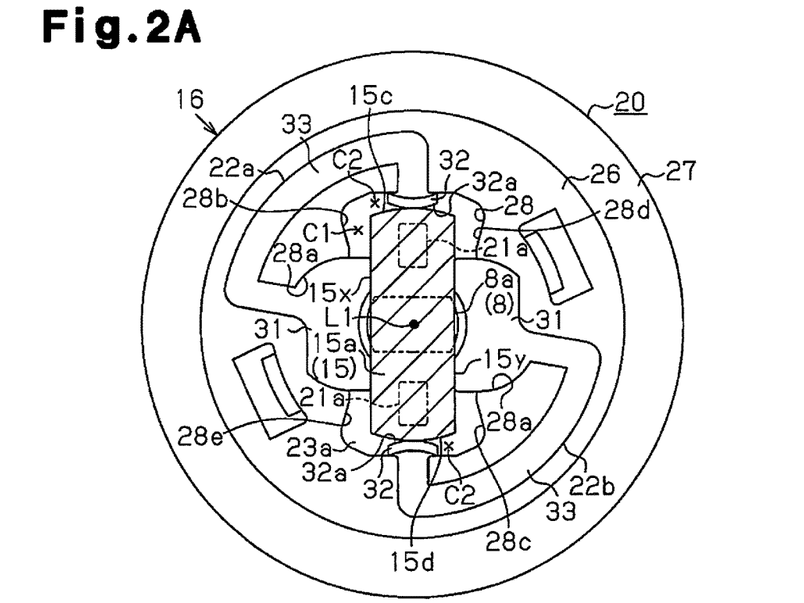
FIG. 2A is a plan view of a joint as viewed from a worm shaft.
Figure 2B:
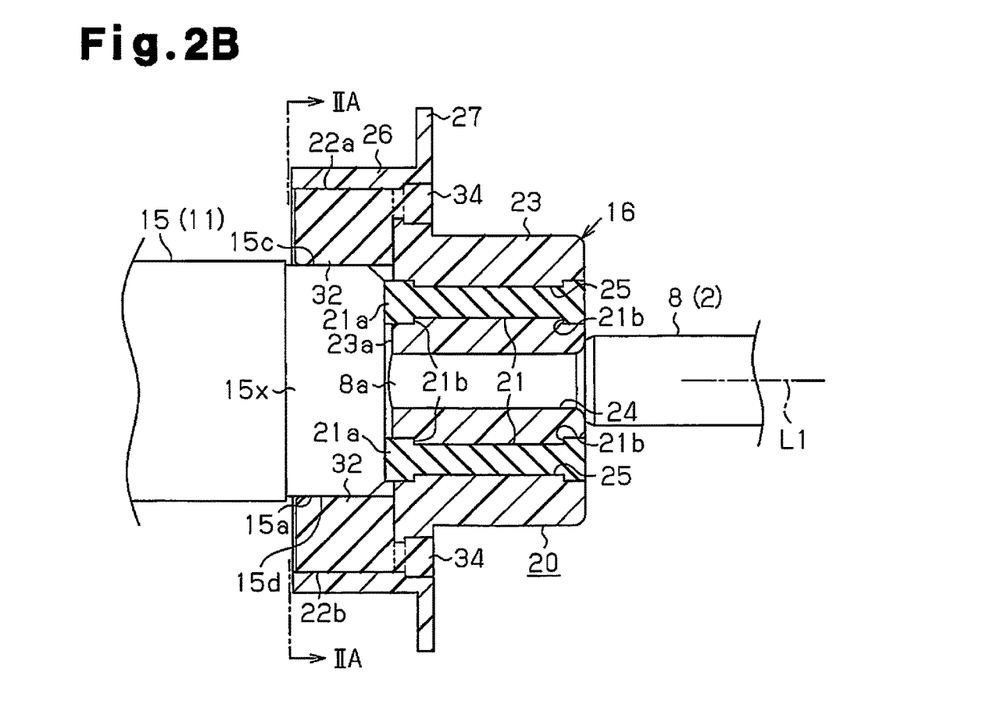
FIG. 2B is a cross-sectional view of the joint.

As shown in FIG. 2A, a coupling hole 28 is formed in a center portion of the worm shaft coupling portion 26. The coupling hole 28 receives the coupling projection 15a, which is formed at the proximal end of the worm shaft 15. The coupling projection 15a of the worm shaft 15 has a flat shape with parallel flat surfaces 15x, 15y, which extend along the axis L1. The coupling projection 15a is formed to be symmetrical about the axis L1. The coupling projection 15a has longitudinal-direction end faces 15c, 15d, which bulge radially outward and are located between the flat surfaces 15x and 15y. In contrast, the inner surface of the coupling hole 28 of the worm shaft coupling portion 26 has an elongated shape slightly larger than the shape of the coupling projection 15a when viewed in the axial direction. That is, the inner surface of the coupling hole 28 has a flattened shape and symmetrical about the axis L1. Clearances C1, C2 are formed between the inner surface of the coupling hole 28 and the coupling projection 15a. Specifically, circumferential clearances C1 are formed between the inner surface of the coupling hole 28 and the flat surfaces 15x, 15y, while radial clearances C2 are formed between the inner surface of the coupling hole 28 and the longitudinal-direction end faces 15c, 15d at the longitudinal-direction ends of the coupling projection 15a.

The worm shaft coupling portion 26 has the second rubber members 22a, 22b, which are embedded by two-color molding. Each of the second rubber members 22a, 22b is formed by a circumferential buffer portion 31, a radial buffer portion 32, and a coupling portion 33, which couples the buffer portions 31, 32 to each other. The second rubber members 22a, 22b are formed symmetrically with respect to the axis L1.

The circumferential buffer portion 31 of each of the second rubber members 22a, 22b has a recess 28a, which is formed by radially outwardly recessing the inner surface of the coupling hole 28. The inner surface of the coupling hole 28 includes contact portion 28b, 28e on both sides of the circumferential buffer portion 31 of the second rubber member 22a, and contact portions 28d, 28c on both sides of the circumferential buffer portion 31 of the second rubber member 22b. The contact portion 28b and the contact portion 28c are symmetrical about the axis L1, and the contact portion 28d and the contact portion 28e are symmetrical about the axis L1. A part of the circumferential buffer portion 31 protrudes radially inward from the recess 28a. In the state illustrated in FIG. 2A, if the motor 1 is not operating, the circumferential buffer portions 31 of the second rubber members 22a, 22b contact the flat surfaces 15x, 15y of the coupling projection 15a at two positions that are symmetrical about the axis L1 of the worm shaft 15. That is, in FIG. 2A, the circumferential buffer portion 31 of the left-hand second rubber member 22a contacts the flat surface 15x at two positions with the axis L1 in between, and the right-hand second rubber member 22b contacts the flat surface 15y at two positions with the axis L1 in between. The two positions at which one of the circumferential buffer portions 31 contacts the flat surface 15x and the two positions at which the other circumferential buffer portion 31 contacts the flat surface 15y are symmetrical about the axis L1.

The radial buffer portions 32 of the second rubber members 22a, 22b project radially inward from the inner surface of the coupling hole 28 and contact the longitudinal-direction end faces 15c, 15d of the coupling projection 15a. A contact surface 32a of each radial buffer portion 32 contacts the coupling projection 15a and projects arcuately radially inward. As described above, in a direction perpendicular to the axis, that is, in the plane of the sheet of FIG. 2A, the coupling projection 15a of the worm shaft 15 is supported from four directions, that is, from both sides in the longitudinal direction and from both sides in the transverse direction by the circumferential buffer portions 31 and the radial buffer portions 32 of the second rubber members 22a, 22b.

Each of the second rubber members 22a, 22b includes an engaging portion 34, which extends axially through the worm shaft coupling portion 26 and is engaged with the coupling portion 26 in the axial direction. The engaging portions 34 prevent the second rubber members 22a, 22b from falling off in the axial direction toward the worm shaft 15.

Operation of the present embodiment will now be described.

Figure 3:
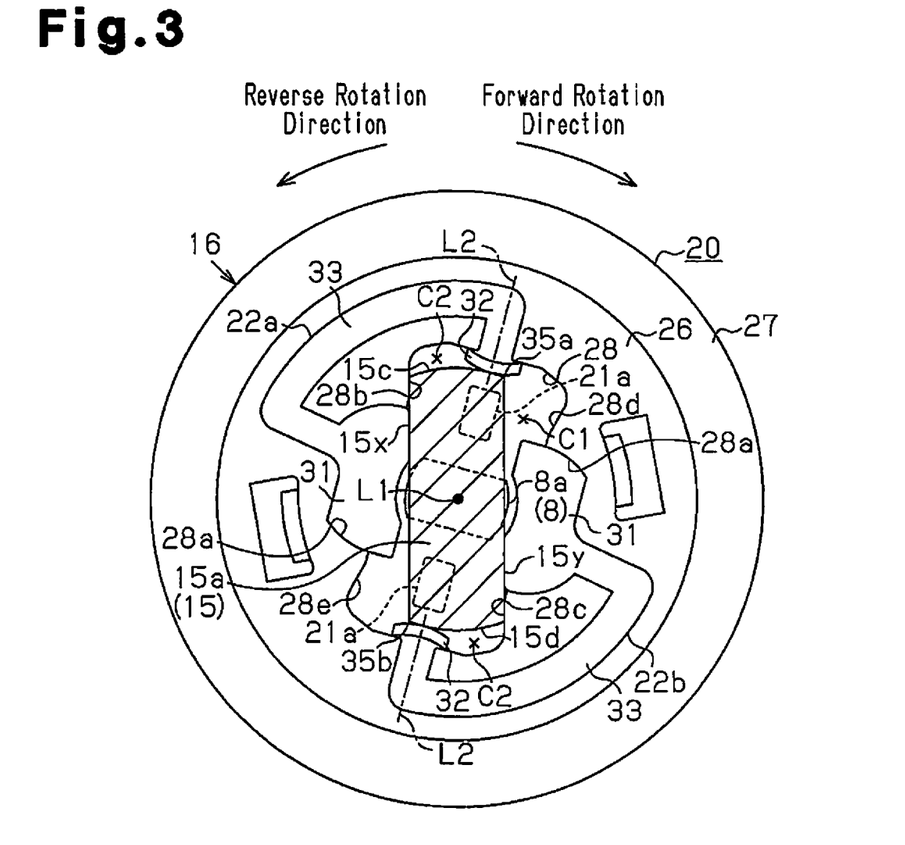
FIG. 3 is an explanatory plan view of operation of the motor.

When the motor body 2 drives the rotary shaft 8 to rotate, for example, in the forward direction, that is, clockwise as viewed in FIG. 2A, the joint 16 rotates together with the rotary shaft 8. Then, the circumferential buffer portion 31 of the second rubber member 22a, which contacts the flat surface 15x of the coupling projection 15a of the worm shaft 15, and the circumferential buffer portion 31 of the second rubber member 22b, which contacts the flat surface 15y of the coupling projection 15a, are compressed and deformed in the circumferential direction by the rotational driving force of the joint 16, that is, the rotary shaft 8 as shown in FIG. 3. When the load at the output shaft 19 reaches or exceeds a predetermined value, the contact portions 28b, 28c on the inner surface of the coupling hole 28 contact the flat surfaces 15x, 15y of the coupling projection 15a in the circumferential direction, respectively, so that the rotation of the joint 16 is transmitted to the coupling projection 15a. This causes the rotary shaft 8, the joint 16, and the worm shaft 15 to rotate integrally, and the rotation of the worm shaft 15 is transmitted to the worm wheel 18. In the rotating state, since the coupling projection 15a of the worm shaft 15 is contacted and held by the circumferential buffer portions 31 and the radial buffer portions 32 of the second rubber members 22a, 22b, the worm shaft 15 is prevented from moving uncontrollably in directions perpendicular to the axis due to, for example, imperfect alignment.

When the load at the output shaft 19 is less than the predetermined value, the rotation of the joint 16 is transmitted to the coupling projection 15a of the worm shaft 15 without the contact portions 28b, 28c on the inner surface of the coupling hole 28 contacting the flat surfaces 15x, 15y of the coupling projection 15a. That is, in this case, the rotation of the joint 16 is transmitted to the coupling projection 15a via the circumferential buffer portions 31 of the second rubber members 22a, 22b, so that the rotary shaft 8, the joint 16, and the worm shaft 15 are rotated integrally. In this rotating state also, since the coupling projection 15a of the worm shaft 15 is contacted and held by the circumferential buffer portions 31 and the radial buffer portions 32 of the second rubber members 22a, 22b, the worm shaft 15 is prevented from moving uncontrollably in directions perpendicular to the axis due to, for example, imperfect alignment.

The motor 1 is configured such that, with the contact portions 28b, 28c of the coupling hole 28 contacting the flat surfaces 15x, 15y of the coupling projection 15a, the circumferential center line L2 of the radial buffer portion 32 of the second rubber member 22a does not go beyond a corner 35a defined by the flat surface 15y and the longitudinal-direction end face 15c of the coupling projection 15a in the forward rotation direction. The same is the case with the radial buffer portion 32 of the other second rubber member 22b. That is, the motor 1 is configured such that the circumferential center line L2 of the radial buffer portion 32 does not go beyond a corner 35b defined by the flat surface 15x and the longitudinal-direction end face 15d of the coupling projection 15a in the forward rotation direction. The corner 35a and the corner 35b are located at symmetrical positions with respect to the axis L1. The motor 1 is configured to act in the same manner when the rotary shaft 8 and the joint 16 rotate in the reverse rotation. Accordingly, when the rotary shaft 8, the joint 16, and the worm shaft 15 rotate integrally, the radial buffer portions 32 of the second rubber members 22a, 22b are prevented from coming off the coupling projection 15a. As a result, for example, catching of the radial buffer portions 32 by the coupling projection 15a is prevented, which would be caused if the radial buffer portions 32 came off the coupling projection 15a.

As described above, when a state in which the rotary shaft 8 and the speed reduction mechanism 11 are rotating in the forward direction is switched to, for example, a state in which the load of the output shaft 19 stops, that is, locks the rotary shaft 8, the worm portion 15b of the worm shaft 15 and the teeth of the worm wheel 18 may be bound to each other. If the rotary shaft 8 is rotated in the reverse rotation in this state, the joint 16 is rotated in the reverse rotation so that the contact portion 28d of the coupling hole 28 contacts the flat surface 15y of the coupling projection 15a, and the contact portion 28e of the coupling hole 28 contacts the flat surface 15x of the coupling projection 15a. By the time the contact portions 28d, 28e contact the flat surfaces 15y, 15x, the rotary shaft 8 and the joint 16 gain rotational inertial force. This releases the teeth of the worm shaft 15 and the teeth the worm wheel 18, which are bound to each other, from each other in a favorable manner. Likewise, when the rotary shaft 8 is rotated in the forward direction after being stopped while rotating in the reverse rotation, the teeth of the worm shaft 15 and the teeth the worm wheel 18, which are bound to each other, are released from each other in a favorable manner. As described above, according to the present embodiment, the worm shaft 15 is prevented from moving uncontrollably by the circumferential buffer portions 31 and the radial buffer portions 32 of the second rubber members 22a, 22b, and inertial force of the rotary shaft 8 is ensured by the circumferential clearances C1 and the radial clearances C2 between the coupling projection 15a and the inner surface of the coupling hole 28.

In the present embodiment, due to the characteristics of the worm shaft 15 and the worm wheel 18, reversal of rotation of the worm shaft 15 generates a load in the axial direction. At this time, the load in the axial direction, which acts toward the motor body 2 and is received by the worm shaft 15, is received by the projections 21a of the first rubber members 21, which contact the coupling projection 15a of the worm shaft 15 in the axial direction. Thus, the first rubber members 21 prevent collision of the coupling projection 15a against the bottom surface of the coupling hole 28 in the axial direction, that is, against the end face 23a of the fixing portion 23 that is close to the worm shaft 15, and collision of the coupling projection 15a against the distal end 8a of the rotary shaft 8. As a result, the generation of noise caused by such collisions is prevented.

The present embodiment has the following advantages.

(1) The joint 16 is rotational integrally with the rotary shaft 8. The joint 16 has the coupling hole 28, into which the coupling projection 15a of the worm shaft 15 is inserted such that the coupling projection 15a has the circumferential clearances C1 and the radial clearances C2. The circumferential buffer portions 31 and the radial buffer portions 32 are located in the circumferential clearances C1 and the radial clearances C2 between the inner surface of the coupling hole 28 and the coupling projection 15a, respectively. The motor 1 is configured such that, when the rotary shaft 8 is rotated by the motor body 2, the inner surface of the coupling hole 28 and the coupling projection 15a compresses and deforms the circumferential buffer portions 31 in the circumferential direction, while contacting each other in the circumferential direction. This reduces uncontrollable movements of the worm shaft 15 when the motor 1 is operating and stopped. As a result, the generation of noise caused by the inner surface of the coupling hole 28 striking the coupling projection 15a is suppressed. Further, when the rotary shaft 8 is driven to rotate in the reverse direction with the worm shaft 15 bound with the worm wheel 18, that is, when the rotary shaft 8 starts rotating in the reverse direction, the rotary shaft 8 rotates while compressing and deforming the circumferential buffer portions 31 between the inner surface of the coupling hole 28 and the coupling projection 15a. During this time, the inertial force, or the momentum of rotation, of the rotary shaft 8 is gained. Thereafter, with the circumferential buffer portions 31 compressed, the inner surface of the coupling hole 28 and the coupling projection 15a contact each other in the circumferential direction while receiving the inertial force of the rotary shaft 8. This releases the teeth of the worm shaft 15 and the teeth of the worm wheel 18, which have been bound to each other, from each other. As described above, according to the present disclosure, the worm shaft 15 is prevented from moving uncontrollably by the circumferential buffer portions 31 and the radial buffer portions 32, and inertial force of the rotary shaft 8 is ensured by the circumferential clearances C1 and the radial clearances C2 between the coupling projection 15a and the inner surface of the coupling hole 28.

(2) The rotary shaft 8 and the worm shaft 15 are made of metal, and the joint 16 is made of plastic and formed separately from the rotary shaft 8 and the worm shaft 15. Accordingly, the inner surface of the coupling hole 28, into which the coupling projection 15a of the worm shaft 15 is inserted, is made of plastic. Thus, when the motor body 2 rotates the rotary shaft 8, noise caused by the inner surface of the coupling hole 28 striking the coupling projection 15a in the circumferential direction is suppressed. This further suppresses the generation of noise.

(3) The circumferential buffer portions 31 and the radial buffer portions 32 are provided in the joint 16, which is a plastic member separate from the rotary shaft 8 and the worm shaft 15. The circumferential buffer portions 31 and the radial buffer portions 32 are therefore formed easily.

(4) Since the circumferential buffer portions 31 and the radial buffer portions 32 are made of rubber, the worm shaft 15 is prevented from moving uncontrollably in a favorable manner.

(5) The first rubber members 21 are located between the coupling projection 15a and the bottom surface of the coupling hole 28 in the axial direction, that is, the end face 23a of the fixing portion 23, which is close to the worm shaft 15. Reversal of rotation of the worm shaft 15 generates a load in the axial direction. The load may cause the coupling projection 15a of the worm shaft 15 to strike the end face 23a of the fixing portion 23, which is close to the worm shaft 15 and the distal end 8a of the rotary shaft 8. However, such possible striking is suppressed by the first rubber members 21. As a result, the generation of noise caused by such striking is suppressed.

(6) The joint 16, which is a plastic member separate from the rotary shaft 8 and the worm shaft 15, has the first rubber members 21. The first rubber members 21 are therefore made easily.

(7) Since the first rubber members 21 are made of rubber, the coupling projection 15a is prevented from striking the bottom surface of the coupling hole 28 in the axial direction, and the coupling projection 15a is prevented from striking the distal end 8a of the rotary shaft 8 in the axial direction in a favorable manner.

(8) The circumferential buffer portions 31 are located radially inward of the contact portions 28b, 28c, 28d, 28e on the inner surface of the coupling hole 28, which contact the coupling projection 15a. According to this configuration, it is possible to ensure the space for the circumferential buffer portions 31 while maintaining the length of the arms for transmitting torque from the rotary shaft 8 to the worm shaft 15, that is, while maintaining a long measurement between the axis L1 of the rotary shaft 8 and the contact portions 28b, 28c, 28d, 28e.

The embodiments of the present disclosure may be modified as follows.

In the above illustrated embodiment, the circumferential buffer portions 31 and the radial buffer portions 32 of the second rubber members 22a, 22b are connected to each other by the coupling portions 33. However, the circumferential buffer portions 31 and the radial buffer portions 32 may be formed separately from each other.

In the above illustrated embodiment, the circumferential buffer portions 31 and the radial buffer portions 32 of the second rubber members 22a, 22b are provided in the joint 16. That is, the circumferential buffer portions 31 and the radial buffer portions 32 are supported by the rotary shaft 8. In a modification, the circumferential buffer portions 31 and the radial buffer portions 32 may be formed on the flat surfaces 15x, 15y of the coupling projection 15a of the worm shaft 15. That is, the circumferential buffer portions 31 and the radial buffer portions 32 may be supported by the worm shaft 15.

In the above illustrated embodiment, the first rubber members 21 are supported by the rotary shaft 8. That is, the first rubber members 21 are provided on the plastic portion 20 located about the distal end 8a of the rotary shaft 8. In a modification, the first rubber members 21 may be supported by the worm shaft 15. For example, the first rubber members 21 may be formed on an axial end face of the coupling projection 15a of the worm shaft 15.

In the above illustrated embodiment, the plastic portion 20 of the joint 16 is fixed to the rotary shaft 8, and the coupling projection 15a of the worm shaft 15 is inserted into the coupling hole 28 of the plastic portion 20. However, in a modification, the relationship may be reversed. That is, the plastic portion 20 may be fixed to the worm shaft 15, and the distal end 8a of the rotary shaft 8 may be used as a coupling projection to be inserted into the coupling hole 28 of the plastic portion 20.

In the above illustrated embodiment, the joint 16 has the plastic portion 20, which is separate from the metal rotary shaft 8, and the plastic portion 20 is fixed to the rotary shaft 8. The embodiment is not limited to this configuration. In a modification, the joint 16 may be made of the same material as and formed integrally with the rotary shaft 8. Further, the joint 16, which functions as a coupling portion, may be provided in the worm shaft 15. The joint 16 may be made of the same material as and formed integrally with the worm shaft 15.

DESCRIPTION OF THE REFERENCE NUMERALS

1 . . . Motor, 2 . . . Motor body, 8 . . . Rotary Shaft, 11 . . . Speed Reduction Mechanism, 15 . . . Worm Shaft, 15a . . . Coupling Projection, 16 . . . Joint as Coupling Portion, 18 . . . Worm Wheel, 20 . . . Plastic Portion,

21 . . . First Rubber Portions (Axial Buffer Portions), 22a, 22b . . . Second Rubber Portions, 28 . . . Coupling Hole, 31 . . . Circumferential Buffer Portions, 32 . . . Axial Buffer Portions, C1 . . . Circumferential Clearances, C2 . . . Radial Clearances.

The invention claimed is:

1. A motor comprising:
   a motor body having a rotary shaft;
   a speed reduction mechanism, which includes a worm shaft and a worm wheel meshed with the worm shaft; and
   a coupling portion, which has a coupling hole and couples the rotary shaft and the worm shaft with each other so that the rotary shaft and the worm shaft are integrally rotational, wherein
   the coupling portion is provided to be rotational integrally with one of the rotary shaft and the worm shaft,
   a coupling projection is provided on the other one of the rotary shaft and the worm shaft, the coupling projection being inserted in the coupling hole,
   a circumferential clearance, which is a clearance in a circumferential direction, and a radial clearance, which is a clearance in a radial direction, are formed between an inner surface of the coupling hole and the coupling projection,
   a circumferential buffer portion is located in the circumferential clearance,
   a radial buffer portion is located in the radial clearance, the radial buffer portion supporting the worm shaft by contacting the worm shaft when the motor body drives the rotary shaft to rotate and
   the inner surface of the coupling hole and the coupling projection are configured to be contactable with each other in the circumferential direction while compressing and deforming the circumferential buffer portion in the circumferential direction when the motor body drives the rotary shaft to rotate and the rotation of the rotary shaft is transmitted to the worm shaft.

2. The motor according to claim 1, wherein
   the rotary shaft and the worm shaft are made of metal, and
   the coupling portion is a plastic member formed separately from the rotary shaft and the worm shaft.

3. The motor according to claim 2, wherein the circumferential buffer portion and the radial buffer portion are provided in the coupling portion.

4. The motor according to any claim 1, wherein the circumferential buffer portion and the radial buffer portion are made of rubber.

5. The motor according to claim 1, wherein an axial buffer portion is located between the coupling projection and a bottom surface of the coupling hole in the axial direction.

6. The motor according to claim 5, wherein
   the rotary shaft and the worm shaft are made of metal,
   the coupling portion is a plastic member formed separately from the rotary shaft and the worm shaft, and
   the axial buffer portion is provided in the coupling portion.

7. The motor according to claim 5, wherein the axial buffer portion is made of rubber.

8. The motor according to claim 1, wherein an inner surface of the coupling portion has a contact portion that contacts the coupling projection, and the circumferential buffer portion is located radially inward of the contact portion of the coupling hole inner surface.

9. The motor according to claim 1, wherein the circumferential buffer portion supports the worm shaft by contacting the worm shaft.

* * * * *